United States Patent Office 3,450,665
Patented June 17, 1969

3,450,665
POLYOXYMETHYLENE COMPOSITIONS
Herman L. Wagner, Livingston, and George F. Hardy, Madison, N.J., assignors to Celanese Corporation, New York, N.Y., a corporation of Delaware
No Drawing. Filed May 24, 1965, Ser. No. 458,424
Int. Cl. C08g 37/02
U.S. Cl. 260—37                    8 Claims

ABSTRACT OF THE DISCLOSURE

Disclosed herein is a method for preparing improved polymer compositions comprising incorporating glass strands into an oxymethylene polymer in the presence of a small amount of halogen acid.

---

The present invention relates to modified oxymethylene polymers. More particularly, the instant discovery concerns polyoxymethylenes containing fillers and additives, these polyoxymethylenes exhibiting enhanced physical properties.

According to the present invention a novel improved polymer composition is prepared by incorporating glass strands into an oxymethylene polymer in the presence of a small but effective amount of a halogen acid, generally the acid being prepared in situ from a salt thereof or other halogen acid-yielding compound. Typically, a minor proportion of ammonium chloride and a minor proportion of chopped glass strands are intimately blended with an oxymethylene polymer containing a small number of oxyethylene units interspersed therethrough. The resulting product manifests improved tensile strength, flex strength, impact strength, etc. Both the products and processes of the present invention will be better understood from the disclosure which follows.

Oxymethylene polymers having recurring —CH$_2$O— units have been known for many years. They may be prepared by polymerizing a source of oxymethylene units, such as anhydrous formaldehyde or trioxane, a cyclic trimer of formaldehyde. High molecular weight solid polyoxymethylenes have been prepared by polymerizing trioxane in the presence of cationic polymerization catalysts, including such compounds as boron trifluoride, antimony trifluoride, antimony fluorborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, thionyl chloride, fluorosulfonic acid, phosphorus trichloride, titanium tetrachloride, ferric chloride, zirconium tetrachloride, aluminum trichloride, stannic chloride, stannous chloride and the alkane sulfonic acids, e.g., ethane sulfonic acid and methane sulfonic acid.

The preferred catalysts are boron fluoride and the boron fluoride complexes with water (such as boron fluoride monohydrate, boron-fluoride dihydrate, and boron fluoride trihydrate), and boron fluoride coordinate complexes with organic compounds, particularly those in which oxygen or sulfur is the donor atom. The coordinator complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether, is the preferred coordinate complex. The boron fluoride complexes with phenol and with acetic acid are also very effective. Other specific boron fluoride complexes, for example, are the complexes with ethanol, methanol, propanol, butanol, methyl acetate, ethyl acetate, phenyl acetate, benzoic acid, acetic anhydride, acetone, methyl ethyl ketone, dimethyl ether, methyl phenyl ether, acetaldehyde, chloral, dimethyl sulfide, and ethyl mercaptan.

Suitable catalysts are disclosed in U.S. Patents 2,989,-505; 2,989,506; 2,989,507; 2,989,508; 2,989,509, all of Donald E. Hudgin and Frank M. Berardinelli; 2,989,510, of George J. Bruni; 2,989,511 of Arthur W. Schnizer, and in the article by Kern et al. in Angewandte Chemie 73, pp. 176–186 (Mar. 21, 1961).

Oxymethylene polymers of improved thermal stability may be prepared by introducing into the polymer chains, or attaching to the ends of the polymer chains, structures which are resistant to thermal detachment. The polymers may include interspersed oxyalkylene units with adjacent carbon atoms and preferably oxyethylene units as disclosed in U.S. Patent No. 3,027,352 of Walling, Brown and Bartz. Copolymers of this type may be described as having at least one chain containing oxymethylene $$(-CH_2O-)$$

units (usually at least 85 mol percent) interspersed with (—OR—) units wherein R is a divalent radical containing at least two carbon atoms directly linked to each other and positioned in the chain between the two valences, with any substituent on the R radical being inert.

Specific interspersed monomeric units which may be incorporated are those derived from lactones, carbonates, cyclic acid anhydrides or ethylenically-unsaturated compounds, such as styrene, divinyl ether, vinyl acetate, vinyl methyl ketone or acrolein, as disclosed in the aforementioned article by Kern et al. The polymers may be endcapped as, for example, by acylation or etherification after polymerization or during polymerization by the use of selected chain transfer agents.

Oxymethylene copolymers and terpolymers with such oxacyclic or oxo-functional compounds as cyclic ethers having at least two cyclic ether rings, dialdehydes and diketones, have also been prepared, as described in, e.g., French Patent No. 1,345,218.

As used in the specification and claims, the term "oxymethylene polymers" denotes homopolymers and copolymers (including terpolymers, etc.) having at least 60% recurring oxymethylene units, and further includes substituted oxymethylene polymers, wherein the substituents are inert, i.e., do not participate in undesirable side reactions.

During molding processes, oxymethylene polymers are generally heated to temperatures between about 180° C. and 220° C. for relatively short periods between about 3 and about 10 minutes. Unless the thermal degradation rate of the polymer has beed reduced to a desirably low level, it has been found that molded products have uneven surface characteristics, due to gassing and that the molding operation produces substantial amounts of formaldehyde gas, which constitutes an industrial hazard. In order to ameliorate this defect and reduce the degradation to a desirable level, chemical stabilizers are added to oxymethylene polymers, as will be seen.

The physical properties of these oxymethylene polymers can also be enhanced by the addition of glass strands to the polymers, such as chopped glass fibers. In so doing, the tensile strength, flex strength and modulus are increased and the thermal coefficient of expansion of the polymer is reduced.

Pursuant to the present invention, however, it has been found that incorporation of the glass strands into oxymethylene polymer in the presence of a small but effective amount of a halogen acid further significantly improves the physical properties of these glass-filled oxymethylene polymers, as indicated hereinbefore. The reason for this improvement is not fully understood but the enhancement is quite evident from the illustrative examples infra.

The preferred halogen acid-yielding additives contemplated herein are the ammonium and amine salts of hydrogen chloride, hydrogen bromide and hydrogen iodide. By the same token very desirable results are achieved by using the acids per se, aluminum chloride plus water, polyvinyl chloride, and like halogen acid (HX)-yielding compounds. Generally, from 0.001% by weight to 0.1%, or slightly greater, of the acid is present for good results, the percentage by weight being based upon the total weight of the polymer. Preferably, from 0.005% to 0.02% by weight is employed.

The glass strands, on the other hand, may be present, and preferably are present, in substantially greater amounts. For example, good results may be achieved when blending equal weights of oxypolymer and glass strands. By the same token, enhanced properties are achieved using as little as 10 weight percent glass strands, based upon the total weight of the glass and polymer in the composition. This is particularly true when using chopped glass fibers in, say, the one-sixteenth ($\frac{1}{16}''$) inch to one-half ($\frac{1}{2}''$) inch size range.

According to a preferred embodiment of the present invention, oxymethylene polymer flakes are blended with the additive, such as ammonium chloride, and the resulting blend heated to the melting point of the oxymethylene polymer or higher. If the oxymethylene polymer is a copolymer having at least 1 chain containing at least 85 mol percent of oxymethylene units interspersed with —OR— units, wherein R is a divalent radical containing at least 2 carbon atoms directly linked to each other and positioned in said chain between the two valences, such as oxyethylene units, heating to a temperature of about 200° C. in a conventional blender, such as a Brabender Plastograph at 30 revolutions per minute (using a nitrogen purge), the glass fibers being then added and mixed for about 15 minutes, provides excellent results. The resulting blend is compression molded in a conventional manner and physical properties determined.

The novel oxypolymers of the present invention have many uses since the possess rheological properties which are suitable for commercial molding or forming operations, e.g., injection molding, compression molding, blow molding, rotational casting, etc., including maintenance of structural integrity over wide molding temperature ranges (e.g., absense of voids, thermal stability, etc.).

As indicated hereinabove, the oxycopolymers of the present invention contain oxymethylene (—CH$_2$O—) units (usually at least 85 mol percent) interspersed with up to about 15 mol percent of (—OR—) units, wherein R is a divalent radical containing at least two carbon atoms directly linked to each other and positioned in the chain between the two valences, with any substituent in the R radical being inert. Suitable such copolymers may have a number average molecular weight of from about 1,000 up to about 80,000 or higher, with inherent viscosities ranging from about 0.2 to about 1.5 or higher. Depending upon the type and extent of property modification sought, the low molecular weight, e.g. 1,000 to 10,000, the high molecular weight 30,000 to 80,000 species, or any mixture thereof may be preferred. The preferred copolymers are disclosed in U.S. Patent No. 3,027,352 of Walling, Brown and Bartz, incorporated herein by reference.

Moldable oxymethylene polymers having branched chains (said chains comprising a plurality of branches of successively recurring oxymethylene units) may also be employed to advantage in the practice of this invention, and may be preferred for certain applications. Such polymers may be prepared by copolymerizing trioxane with a small amount of a chain branching agent, the small amount being sufficient to link some primary oxymethylene chains to provide a branched structure but insufficient to make the polymer in tractable. Primary chains are linear chains comprising successively recurring oxymethylene units and are the chains which would be produced if the chain branching agent were omitted from the system. The amount of chain branching agent used is generally not more than that required to provide one link to another chain for each primary chain in the system.

Suitable chain branching agents, depending on the particular circumstances involved, include those having at least two functional oxygen groups including (1) cyclic ethers having at least two cyclic ether rings, such as 2,2-(trimethylene)bis-1,3-dioxolane, and particularly those compounds having (a) at least two epoxy rings, such as polyepoxides, including diepoxides, triepoxides, etc., (b) at least two formal rings, such as pentaerythritol diformal, and (c) at least one epoxy ring and at least one formal ring, such as monocrotylidene trimethylolethane monoepoxide; and (2) compounds having at least two oxo groups, such as dialdehydes and diketones, such as glutaraldehyde, terephthaldehyde and acrolein dimer.

Suitable polyepoxides include those which may be prepared by the epoxidation of compounds having two or more olefinic linkages. Diepoxides of diolefins are usually used and the epoxidized olefinic bonds may be of aliphatic or cycloaliphatic structures. Particular diepoxides which may be used include butadiene dioxide, vinyl cyclohexane dioxide (1-epoxyethyl-3,4-epoxycyclohexane), limonene dioxide, resorcinol diglycidyl ether, butane diol diglycidyl ether, bis-epoxydicyclopentyl ether of ethylene glycol, dicyclopentadiene dioxide and dicrotilidene pentaerythritol diepoxide. Suitable triepoxides include triglycidyl trimethylol propane prepared by reacting the triallyl ether of trimethylolpropane in a solvent with peracetic acid at a temperature of 0° to 75° C. (as disclosed in application Ser. No. 152,672, filed on Nov. 15, 1961 by Sammy Carpenter). Suitable polyepoxides include a polyepoxy glyceryl ester containing an average of 5.5 epoxy groups per molecule, known as Epoxol 9–5 (sold by Swift & Co.).

The chain branching agents are usually copolymerized with the trioxane in proportions from about 0.01 to about 7 weight percent, preferably less than about 1%, and most preferably from about 0.05 to about 0.80 weight percent of the chain branching agent based on the weight of trioxane.

The most preferred such polymers are terpolymers of trioxane, a chain branching agent as described above, and a bifunctional compound. Preferred bifunctional compounds include (1) those having at least two functional groups, (2) those having at least one unsaturated bond, (3) at least one openable ring structure and (4) combinations of two or more of (1), (2) and (3). Specific bifunctional materials include those disclosed in this application, U.S. Patent No. 3,027,352 and the Kern et al. article referred to previously. In accordance with a preferred embodiment, the bifunctional compounds provide —OR— units interspersed among the oxymethylene groups wherein R is a divalent radical containing at least two carbon atoms directly linked to each other and positioned in the chain between the two valences, with any substituents, e.g., hydrocarbons, halohydrocarbons, being inert, e.g., with respect to formaldehyde under the conditions of polymerization.

Preferred terpolymers have chains containing (1) oxymethylene groups interspersed with (2) oxyalkylene groups with adjacent carbon atoms derived from the bifunctional compounds (preferably cyclic ethers having adjacent carbon atoms) and (3) oxyalkylene groups having carbon atoms linked to other chains, the last named groups being derived from the chain branching agents.

Particularly preferred terpolymers are those wherein the (2) oxyalkylene groups with adjacent carbon atoms are oxyethylene groups derived by opening the ring structure of cyclic ethers containing oxyethylene groups, such as ethylene oxide and 1,3-dioxolane.

Other specific cyclic ethers having adjacent carbon atoms which may be used are 1,3,5-trioxepane, 1,3-dioxane, trimethylene oxide, penetamethylene oxide, 1,2-propylene oxide, 1,2-butylene oxide, neopentyl formal, tetrahydrofuran and butadiene monoxide. Because of the fact that the inclusion of the chain branching agent produces polymers of lower melt index, terpolymers containing relatively high proportions of such cyclic ethers with adjacent carbon atoms, e.g., about 10 wt. percent, are substantially improved over comparable copolymers containing no chain branching agent.

In the preferred terpolymers there is generally from about 7.5 to about 99.5 percent by weight of recurring oxymethylene units, from about 0.5 to about 25 percent by weight of recurring units derived from the bifunctional compound (such as a cyclic ether with adjacent carbon atoms) and from about 0.01 to about 7 weight percent of units derived from the chain branching agent. The most preferred terpolymers have from about 96.1 to 97.9 percent by weight of oxymethylene units and less than about 1%, preferably between about 0.05 and 0.80 percent by weight, of units from the chain branching agent.

Such polymers are more fully disclosed in application Ser. No. 229,715 of Heinz and McAndrew, filed Oct. 10, 1962 and incorporated herein by reference.

As suggested hereinabove, the process of the present invention may be conducted in any suitable blending apparatus. For example, incorporation of the additives into the oxymethylene polymer may be carried out in a roll mill apparatus having oppositely rotating hollow cylindrical rolls of, e.g., 12-inch diameter, driven at a speed in the range of 20 to 40 revolutions per minute, and steam heated to a temperature in the range of 165° C. to about 195° C. The cylindrical rolls have a variable clearance ranging down to a few thousandths of an inch, which clearance is varied during the course of the milling.

Oxymethylene copolymers of the type described hereinbefore and having interspersed carbon-to-carbon linkages may be stabilized by degrading the unstable end portions of the molecules consisting of successive terminal oxymethylene groups until a stable terminal group having a carbon-to-carbon linkage, e.g., an oxyethylene terminal group, is reached. The degradation may be thermal degradation, as disclosed in U.S. Patent 3,103,499 of Dolce and Berardinelli on Apr. 2, 1959 or by hydrolysis, as disclosed in application Ser. No. 372,390 filed June 3, 1964, which is a continuation-in-part of Application Ser. No. 102,097 filed Apr. 11, 1961. The preferred copolymers of this invention may be stabilized by either of these methods, although stabilization by hydrolysis is preferred.

As indicated hereinabove, thermal stabilizers are frequently incorporated into the oxymethylene polymers of the present invention. For example, the thermal stability of oxymethylene polymers is enhanced by incorporation therein of at least one amidine compound, i.e., a compound having a carbon atom doubly bonded to one nitrogen atom and singly bonded to another. Preferred amidine compounds are the N-substituted amidine compounds wherein another nitrogen atom is singly bonded to the amidino group, most preferbaly at the carbon atom. Another preferred class of amidine compounds is that in which the carbon atom of the amidino group is bonded to another carbon atom, an oxygen atom or an hydrogen atom.

Suitable amidine compounds include the cyanoguanidine compounds including cyanoguanidine, itself, and other compounds including those containing the divalent 1-cyano-3,3-guanidino radical:

$$N{\equiv}C{-}NH{-}\underset{NH}{\overset{\|}{C}}{-}N\underset{R_2}{\overset{R_1}{\diagup}}$$

Among the suitable substituted cyanoguanidines which may be used are those having one or two suitable inert substituents at the 3-nitrogen position of the guanidine nucleus. For example, in the above formula, $R_1$ and $R_2$ may be the same or different inert substituents including hydrogen, alkyl, aryl, cycloalkyl, hydroxyalkyl, haloalkyl, haloaryl and other substituents. Suitable inert substituents are defined, in the instant application, as those which will not induce undesirable reactions. Specific compounds which are suitable include 1-cyano-3-methyl guanidine, 1-cyano-3-ethyl guanidine, 1-cyano-3-isopropyl guanidine, 1-cyano-3,3-diphenyl guanidine, 1-cyano-3-hydroxymethyl guanidine, 1-cyano-3-dodecyl guanidine, 1-cyano-3-(2-hydroxyethyl) guanidine, 1-cyano-3-(2-bromoethyl) guanidine, 1-cyano-3-(m-chlorophenyl) guanidine and 1,3-dicyanoguanidine.

Polyaminotriazoles comprise another suitable class of amidine compounds.

Polyaminotriazoles are suitably prepared by heating a mixture of dihydrazide of a dicarboxylic acid with aqueous hydrazine hydrate. For a particular dihydrazide the molecular weight of the product will depend upon the temperature of the reaction, the proportion of water and the duration of the reaction. Higher temperatures, lower proportions of water and longer reaction periods are conductive to higher weights.

Suitable polyaminotriazoles are those having structural units of the formula $$\left[ -R-\underset{N\overset{}{-\!\!\!-\!\!\!-}N}{\overset{\overset{NH_2}{\underset{|}{N}}}{C\diagup\diagdown C}}- \right]$$

wherein R is an inert divalent organic radical free from groups which will induce undesirable reaction (thereby including only inert groups therein) and having two terminal carbon atoms through which it is joined to the triazole rings. Suitable polyaminotriazoles may be prepared from the dihydrazides of acids such as the following:

Isophthalic acid
Terephthalic acid
Phenylene diacetic acid
Phenylene dipropionic acid
Phenylene diproprionic acids
Phenylene dibutyric acids
p,p'-dicarboxyl-1,5-diphenoxypentane,
p,p'-dicarboxyl-1,4-diphenoxybutane
p,p'-dicarboxy-diphenoxymethane
p-carboxy-5-phenoxymethyl pyromucic acid
Thio bis cenanthic acid
Thio bis caproic acid
Sulfone bis caproic acid
Thio bis valeric acid
Sulfone bis propionic acid
Thio bis butyric acid
Sulfone bis butyric acid
Thio bis acetic acid
Sulfone bis acetic acid
p,p'-dicarboxy diphenyl
1,4-dicarboxynaphthalene
Pinic acid
Norpinin acid
Homopinic acid Preferably R is an inert alkylene group of 6 to 12 carbon atoms. Such polyaminotriazoles are prepared as described above, utilizing as reactants the dihydrazides of dialkanoic acids having from 8 to 14 carbon atoms. Among the preferred dihydrazides are isosebacic dihydrazine, sebacic dihydrazide, azelaic dihydrazide, suberic dihydrazide, adipic dihydrazide, methyl adipic dihydrazide, decanedioic and undecanedioic dihydrazide.

Polyaminotriazoles suitable for use in accordance with this invention include polymers having an inherent viscosity of at least 0.3 and preferably from 0.3 to 0.7 in 0.1 wt. percent solution of m-cresol at 25° C.

When the polyaminotriazoles are prepared by the reaction of the dihydrazide and aqueous hydrazine, the preferred conditions for obtaining a product of the molecular weight specified above include a temperature between about 140° and 260° C., an amount of hydrazine between about 30 and 33 percent by weight, based on the weight of the dihydrazide, an amount of water between about 6 and 7 percent based on the weight of the dihydrazide and a reaction period between about 18 and 24 hours.

Polyaminotriazoles suitable for use in oxypolymers of this invention may be prepared in other ways, as for example by the reaction of one mole of a dicarboxylic acid with more than two moles of aqueous hydrozine.

A complete description of the polyaminotriazoles suitable for use in oxypolymers of this invention and of the methods for making such polyaminotriazoles may be found in U.S. Patent 2,512,601 of Bates et al. and U.S. Patent 2,512,667 of Moncrieff et al.

Amine-substituted triazines constitute another suitable class of imidine compounds.

The preferred compounds of this class are amine-substituted derivatives of symmetrical triazines, including guanamines (2,4-diamo sym. triazines) melamine (2,4,6-triamino sym. triazine) and substituted melamines. The amino groups may be primary, secondary or tertiary and other substituents such as hydroxy substituents, may be present. Of course, the amino group and other substituents must be those which are inert, i.e., will not induce undesirable reactions. Aong the specific compounds which are suitable are:

2,4-diamino-6-phenyl sym. triazine (benzoguanamine);
2,4-diamino-6-methyl sym. triazine;
2,4-diamino-6-butyl sym. triazine;
2,4-diamino-6-benzyloxy sym. triazine;
2,4-diamino-6-butoxy sym. triazine;
2-4-diamino-6-cyclohexyloxy sym. triazine;
2,4-diamino-6-chloro sym. triazine;
2,4-diamino-6-mercapto sym. triazine;
2,4-dihydroxy-6-amino sym. triazine (ammelide);
2-hydroxy-4,6-diamino sym. triazine (ammeline);
N,N,N',N'-tetracyanoethyl benzoguanamine;
2,4,6-triamino sym. triazine (melamine);
phenyl melamine;
butyl melamine;
N,N-diethyl melamine;
N,N-diallyl melamine;
N,N',N''-trimethyl melamine;
N,N',N''-triethyl melamine;
N,N',N''-tri(n-propyl) melamine;
N,N',N''-tri-(n-butyl) melamine;
N,N,N',N''-tetramethyl melamine;
trimethylol melamine;
trimethoxymethyl melamine;
hexamethoxymethyl melamine;
N,N',N''-triphenyl melamine; and
N,N',N''-trimethylol melamine.

Compounds with an imidazoline nucleus constitute still another suitable class of amidine compounds. Suitable compounds of this class include those having the formula

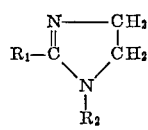

wherein $R_1$ and $R_2$ are inert monofunctional radicals which will not induce undesiable reactions. An especially preferred class of compounds are those wherein $R_1$ is a long chain (at least eleven carbon atoms) aliphatic hydrocarbon group such as an alkyl group, a monoolefinic group or a diolefinic group. $R_2$ may be a short chain (1–10 carbon atoms) aliphatic radical and may contain other functional groups, such as omega hydroxy groups or omega amine groups, 2-aminoethyl and 2-hydroxyethyl groups are particularly useful at the $R_2$ position.

Among the specific imidazoline compounds which are useful are those sold in the trade as "Nalcamines," including "Nalcamine G–11" wherein $R_2$ is a 2-hydroxyethyl group and $R_1$ is a mixture of 11, 13, 15 and 17 carbon aliphatic groups, "Nalcamine G–12" wherein $R_2$ is a 2-hydroxyethyl group and $R_1$ is a mixture of heptadecenyl and heptadecadienyl radicals, "Nalcamine G–13" wherein $R_2$ is a 2-hydroxyethyl group and $R_1$ is a heptadecenyl group, "Nalcamine G–14" wherein $R_2$ is a 2-hydroxyethyl group and $R_1$ is a mixture of pentadecyl and heptadecyl groups, and "Nalcamine G–39M" wherein $R_2$ is a 2-aminoethyl group and $R_1$ is a mixture of heptadecenyl and heptadecadienyl groups. Other suitable imidazoline compounds include compounds of the above formula wherein $R_1$ is hydrogen or a lower alkyl group, such as a methyl, ethyl, isopropyl or butyl group.

It has been found that, for satisfactory results, the amidino group must be present in sufficient strength in the molecule containing it. In a preferred embodiment there must be at least one amidino group for every 22 carbon atoms of the molecule containing the amidino group.

In still another particular embodiment, admixtures of more than one amidine compound may be employed as the stabilizer. These amidine compounds may represent members of the same or different classes as set forth in the foregoing description. Mixtures of amine-substituted triazines and cyanoguanidines are preferred, with a mixture of a cyanoguanidine, and a melamine, being a particularly preferred embodiment. Such amidine mixtures may be provided in all proportions of the components and the components may be added to the oxymethylene polymer singly or in admixture.

In a preferred embodiment of this invention the polymer composition also contains a phenolic material, preferably an alkylene bisphenol, as a thermal stabilizer. It appears that the stabilization action of the amidine compounds and of the phenols enhance each other so that a mixture of a stabilizer of each class is more effective than a comparable amount of stabilizer of either class, by itself.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4 - methyl - 6 - tertiary butyl phenol); 2,2'-ethylene bis-(4-methyl-6-tertiary butyl phenol); 4,4'-ethylidene bis-(6-tertiary butyl-3-methyl phenol); and 4,4'-butylidene bis-(6-tertiary butyl-3-methyl phenol). Suitable phenolic stabilizers other than alkylene bis-phenols include 2,6-ditertiary butyl-4-methyl phenol, octyl phenyl and p-phenyl phenol.

Particularly effective are the mixtures in all proportions of at least two amidine compounds and a phenolic stabilizer, such as the mixture of a cyanoguanidine, an amine-substituted triazine, and an alkylene bisphenol. The most preferred such stabilized combinations employ a melamine compound as the amine substituted triazine.

While the amidine-phenolic compound stabilizer system imparts the desired thermal stability, with certain systems the stabilized polymer may exhibit slight undesirable exudation upon maintenance for extended periods of time at elevated temperatures. Similarly certain other such systems may result in the stabilized polymer exhibiting undesirable color characteristics.

Melamine compound-cyanoguanidine compound admixtures have been found to optimize thermal and structural stability and color properties of the stabilized polymer, and in some instances represent an improved stabilizer system over the use of either amidine compound, alone. Most preferably, the stabilizer system comprises a melamine compound, a cyanoguanidine compound, and a phenolic material such as the alkylene bisphenols.

The amidine compounds are generally admixed with the oxymethylene polymer in amounts not exceeding 5%, based on the weight of the oxymethylene polymer, preferably in amounts between about 1 and 0.1 weight percent and most preferably between about 0.03 and 0.2 weight percent. The alkylene bisphenol, when used, is admixed in amounts not exceeding 5 weight percent and preferably from about 1 to about 0.1 weight percent, most preferably 1 to 0.3 wt. percent.

While mixtures of amidines, and mixtures therewith of phenolic stabilizers, may be employed in all proportions, in a preferred embodiment the stabilizer system comprises from about 0.01 to 0.2 weight percent of an amine substituted triazine, and from .05 to 1.0 weight percent of a cyanoguanidine, most preferably in combination with from about 0.3 to 1.0 weight percent of an alkylene bisphenol.

The amidine compounds, and the alkylene bisphenols, if desired, may be admixed intimately with the oxymethylene polymer by being applied in solution in a suitable solvent to the finely divided solid oxymethylene polymer followed by evaporation of the solvent.

The admixture may also be made by dry blending the finely divided oxymethylene polymer and finely divided stabilizers and by milling the stabilizers into the polymer as the latter is worked on a rubber mill.

The compositions of this invention may also include, if desired, plasticizers, pigments and other stabilizers such as those which are stabilizers against degradation by ultraviolet light. The oxymethylene polymer may be stabilized against degradation by ultraviolet light by the addition, for example, of about 1% by weight of 2,2′- dihydroxy-4,4-dimethoxy-benzophenone; 2-hydroxy-4-methoxy benzophenone; 2-hydroxy-4-methoxy-4′-chlorobenzophenone, etc.

While a few of the hydrogen halide (HX)-yielding additives contemplated herein are given hereinabove, the present invention is definitely not limited thereto. The following salts of hydrogen halides further illustrate the scope of the present invention: monoalkyl ($C_1$–$C_{20}$) amine salts; such as ethylamine HCl; dialkylamine salts containing up to about 24 carbon atoms; trialkylamine salts containing up to about 24 carbon atoms; aniline salts, both phenyl and N-substituted (mono- and di-), said substituents being selected from lower alkyl; cycloaliphatic amine salts, such as cyclopentylamine hydrohalide, cyclohexylamine hydrohalide, and the like; other aromatic amine salts, e.g., naphthylamine; hetero-N cyclic amines, such pyridine, lower alkyl-substituted pyridine, piperidine; and other like HX-yielding amine salts.

Other additives within the purview of the instant discovery are metal halides, such as transition metal halides capable of giving up a halogen acid with $H_2O$ or $H_2O$ and heat, e.g. $TiCl_4$, $PCl_5$, and the like; chlorosulfonated polyethylene (e.g. Hypalon sold by E. I. du Pont de Nemours Company); chlorinated or brominated hydrocarbons, such as chlorinated polyethylene; halogenated hydrocarbon waxes; chloroisoprene rubbers; and like hydrogen halide (HX)-yielding additives. Common to all of these, as indicated hereinabove, is their ability to generate hydrogen halides of the type contemplated when incorporated into oxymethylene polymers.

The present invention will best be understood from the examples which follow. Percents are given by weight therein, unless otherwise indicated, and melt indices are determined by heating a sample of a polymer in a standard cylinder to a standard temperature of 190° C. and forcing it under a standard load of 2.160 kilograms through a standard orifice of 0.0825-inch diameter and 0.315-inch long for a standard period and weighing the polymer passing through the orifice during this period. The results are reported in grams per 10 minutes. The test is described in detail in ASTM D–1238–57T.

The melt index (10×) is generally used when melt index values are low and is determined in an identical manner, except that the standard load is increased tenfold to 21.60 kilograms.

Thermal degradation rate constants ($K_D 230$) are determined by blending a 5 gram polymer sample with a suitable chemical stabilizer system (preferably 0.5 weight percent of 2,2′-methylene bis 4-methyl-6-t-butylphenol, 0.02–0.04 weight percent of melamine, and 0.08–0.12 weight percent of cyanoguanidine), placing the sample in a circulating air oven maintained at 230° C. for a period of 45 minutes and reweighing the sample. The thermal degradation is expressed as the average rate of weight loss over the test period.

All other data were determined in accordance with ASTM Standards, except as otherwise indicated.

EXAMPLES I–XI

Thirty grams of oxymethylene copolymer flake having a melt index (1×) of 9.0 decigrams per minute and having 2 mol percent oxyethylene units and 98 mol percent oxymethylene units, and stabilized using 0.5 weight percent of 2,2′-methylene bis (4-methyl-6-tertiary butyl phenol), 0.03 weight percent of melamine and 0.10 weight percent of cyanoguanidine (these last three weight percentages being based upon the weight of the oxymethylene copolymer), and containing the additive and amount thereof indicated below, is heated to 200° C. in a Brabender Plastograph operated at 30 revolutions per minute using a nitrogen purge. The ⅛-inch chopped glass strands (20 grams of Owens-Corning type 847) are then added and mixed in for 15 minutes. The resulting blend is then compression-molded into a 3-inch x 3-inch x ⅛-inch slab using standard molding conditions (viz 1000 pounds per square inch pressure, 6 minutes at 190° C., 6 minutes at 125° C., and then 2 minutes at room temperature). Notched Izod impact strength (ft.-lb./in. of notch) is determined on specimens cut from the slab, following ASTM D–256–56, and thermal degradation constants ($K_D 230$) are determined as indicated hereinabove:

| Example No. | Additive | Weight percent | Izod impact strength | $K_D 230$ |
|---|---|---|---|---|
| II | None | | 0.78 | 0.010 |
| III | Glass strands washed with 0.1 normal HCl. | | 1.40 | 0.176 |
| IV | Aluminum chloride | 0.01 | 1.04 | 0.030 |
| V | do | 0.02 | 1.63 | 0.056 |
| VI | do | 0.03 | 1.91 | 0.142 |
| VII | Ammonium bromide | 0.01 | 1.12 | 0.038 |
| VIII | Chloroacetic acid | 0.01 | 0.97 | 0.021 |
| IX | do | 0.02 | 1.31 | 0.036 |
| X | Ammonium chloride | 0.015 | 2.00 | 0.056 |
| XI | Polyvinyl chloride | 0.01 | 0.86 | 0.031 |

EXAMPLES XII–XXVII

The above examples are repeated in every essential respect with the exception that the additives are as follows:

| Example No. | Additive | Procedure of Example No. |
|---|---|---|
| XII | Dihexylamine HCl | IV |
| XIII | Ethylamine HCl | V |
| XIV | Undecylamine HBr | VI |
| XV | Trioctylamine HCl | VII |
| XVI | Aniline HCl | VIII |
| XVII | 3-methylphenylamine HCl | IX |
| XVIII | Cyclohexylamine HCl | VI |
| XIX | Naphthylamine HBr | XI |
| XX | Pyridine HCl | VII |
| XXI | Piperidine HCl | X |
| XXII | Titanium tetrachloride | XI |
| XXIII | Phosphorus pentachloride | V |
| XXIV | Chlorosulfonated polyethylene [1] | IV |
| XXV | Chlorinated polyethylene | V |
| XXVI | Chlorinated hydrocarbon wax | IX |
| XXVII | Chloroisoprene rubber | VIII |

[1] Hypalon sold by E.I. du Pont de Nemours Co.

The above examples are merely representative of the additives contemplated herein. The person skilled in the art will readily recognize the multiple and varied additives within the purview of the instant discovery, additives which provide a hydrogen halide for the process of the present invention and the resulting highly improved oxymethylene polymers. It has also been observed that the physical properties are noticeably enhanced when thermal stabilizers of the type described hereinabove are present. The stabilizers of Examples I–XXVII are merely typical of the various amidine and phenolic stabilizers within the purview of the instant discovery.

As suggested hereinbefore, the mixing sequence of the polymer-glass-additive components is not critical, the various procedures described above being merely illustrative. Likewise, blending temperatures, percentage of the additive component, length of the glass fibers, etc., as indicated above, may be varied considerably within the substantial ranges given herein and the desired product achieved. Several additives may be used at once provided the combined weight thereof is within the concentration range recited above.

Clearly, therefore, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

What is claimed is:

1. A process for preparing a normally solid synthetic oxymethylene polymer which comprises intimately admixing with an oxymethylene polymer of a molecular weight of from about 1,000 to about 80,000 having at least one chain containing at least 85 mol percent of oxymethylene ($-OCH_2$) units interspersed with $-OR$ units, wherein R is a divalent radical containing at least two carbon atoms directly linked to each other and positioned in said chain between the two valences, any substituent in said R radical being inert, containing a thermal stabilizer comprising an amidine compound, from 0.001% to about 0.1% by weight of an additive which yields a halogen acid upon heating, heating said admixture to the melting point or higher of said oxymethylene polymer and admixing therein up to about equal parts by weight of glass fibers.

2. The process of claim 1, wherein said additive which yields a halogen acid upon heating is a member selected from the group consisting of an ammonium salt of a hydrogen halide; a hydrogen halide salt of a monoalkyl ($C_1$–$C_{20}$) amine; a hydrogen halide salt of a dialkylamine containing up to 24 carbon atoms, a hydrogen halide salt of a trialkylamine containing up to 24 carbon atoms; a hydrogen halide salt of aniline; a hydrogen halide salt of a lower alkyl-substituted aniline, said substituents being on the phenyl moiety; a hydrogen halide salt of a lower alkyl N-substituted aniline, mono- and di-; a hydrogen halide salt of a cycloaliphatic amine; a hydrogen halide salt of a naphthylamine; a hydrogen halide salt of a hetero-N cyclic amine; a transition metal halide capable of giving up a halogen acid with $H_2O$; chlorosulfonated polyethylene; chloroacetic acid; a halogenated hydrocarbon capable of giving up a halogen acid upon heating; and a polyhydrocarbon halide capable of giving up a halogen acid upon heating.

3. The process of claim 1, wherein the glass fibers have been previously silane treated.

4. The process of claim 1 wherein the additive is aluminum chloride.

5. The process of claim 1 wherein the additive is ammonium bromide.

6. The process of claim 1 wherein the additive is chloroacetic acid.

7. The process of claim 1 wherein the additive is ammonium chloride.

8. The process of claim 1 wherein the additive is polyvinyl chloride.

References Cited

UNITED STATES PATENTS 3,164,563    1/1965    Maxwell et al. _____ 260—67

OTHER REFERENCES

W. Kern, "Polyoxymethylenes," Ange. Chemie. 73 No. 6, Mar. 21, 1961, pp. 177–186. Translation; pp. 1, 15, 14, 19, 20, and 21 are relied upon.

J. Furukawa and I. Saegusa, "Polymerization of Aldehydes and Oxides," Interscience Publ., New York, 1963, Call No. QA281.P6F8, pp. 257–59, 276–77, 286–88 relied upon.

M. Sittig, "Polyacetal Resins," Gulf Pub. Co., Houston, Texas, pp. 108–10 and 122–27.

Fiberfil, "Fiberglass Reinforced Thermoplastic," Fiberfil Inc, Evansville, Ind., Form No. 2393–64, p. 17 relied upon.

MORRIS LIEBMAN, *Primary Examiner.*

L. T. JACOBS, *Assistant Examiner.*